United States Patent [19]
Williams et al.

[11] 4,091,602
[45] May 30, 1978

[54] CROP HARVESTING MACHINE WITH FLEXIBLE CUTTER BAR

[75] Inventors: Millard M. Williams; Robert A. Stelzer, both of Celina, Ohio

[73] Assignee: Avco Corporation, Coldwater, Ohio

[21] Appl. No.: 757,957

[22] Filed: Jan. 10, 1977

Related U.S. Application Data

[63] Continuation-in-part of Ser. No. 614,400, Sept. 18, 1975, abandoned.

[51] Int. Cl.² .......................................... A01D 55/32
[52] U.S. Cl. ...................................... 56/14.4; 56/11.1; 56/15.3
[58] Field of Search ................ 56/14.4, 14.3, 14.5, 56/14.6, 10.2–10.4, 11.1, 15.8, 208, 158, 15.3

[56] References Cited

U.S. PATENT DOCUMENTS

| | | | |
|---|---|---|---|
| 2,599,438 | 6/1952 | Downing et al. | 56/158 |
| 2,763,118 | 9/1956 | Gustafson | 56/158 |
| 3,886,718 | 6/1975 | Talbot | 56/208 |
| 3,982,383 | 9/1976 | Mott | 56/208 X |

*Primary Examiner*—Jay N. Eskovitz
*Attorney, Agent, or Firm*—Robert J. McNair, Jr.; Irwin P. Garfinkle; Abraham Ogman

[57] ABSTRACT

Disclosed is a crop harvesting machine for collecting stalk crops having seed pods near ground level. The harvester includes a horizontally disposed reel structure. As the reel rotates, bat-assemblies thereon successively urge the stalks of the crop against a cutter bar which severs them close to the ground. The cutter bar and its associated sickle drive assembly accommodate the irregular variations in ground contour, by reason of the interposition of leaf springs between the cutter bar assembly and the cutter carrying platform. When not required the flexible cutter bar feature can be disabled. Sensing fingers mounted on the underside of the machine relay information to an automatic elevational control unit assuring that the cutter carrying platform closely follows the contour of the ground.

11 Claims, 12 Drawing Figures

CROP HARVESTING MACHINE WITH FLEXIBLE CUTTER BAR

BACKGROUND OF THE INVENTION

This is a Continuation-in-Part of copending application Ser. No. 614,400, filed Sept. 18, 1975, now abandoned.

Our invention relates to improvements in crop harvesting machines which are capable of cutting stalk crops close to the ground. Basic working components of the harvester are the cutter bar, a reel, a cutting platform to collect the severed plants, a cross auger assembly to centrally group the harvested plants, and an elevator assembly to deliver the plants to a thresher or processor.

Several different harvesters have been built for use in harvesting low growing crops such as lentils, soybeans and peas. U.S. Pat. No. 1,996,294 by Love and Hume describes a harvester having a cutter bar which provides limited up and down movement with respect to the main frame. The U.S. patent to Hume U.S. Pat. No. (2,795,922) describes improvements over the earlier unit. U.S. Pat. No. 3,388,539 by Novak describes a floating cutter bar mount and sickle drive which can accommodate the irregular variations in ground contour. U.S. Pat. No. 3,597,907 by Neal describes a header elevational control system intended to keep the sickle bar close to the ground but not gouging therein. None of the above has the features and advantages of my harvester.

Our harvester has a low profile platform structure which enables the saving of much of the grain dislodged from the plants (during pickup, cutting and conveying). My construction makes it possible for the cross auger to operate in a small depression at the rear of the contoured deck. This serves to gather loose kernels of grain into the foliage so that the entire crop is delivered into the thresher. Test results show that a harvester built according to the teachings of my invention has significantly lower crop gathering losses for soybeans than other currently available machines.

SUMMARY OF THE INVENTION

The invention pertains to improvements in harvesters mounted transversely in front of a combine, mobile thresher or the like. Basic working components of the harvester include a main frame, a cutter bar mounted on the forward edge thereof, a rotating reel assembly, a transversely extending platform to collect the severed plants, a cross auger assembly operating to centrally group the plants urged across the platform by the reel, and an elevator to deliver the plants from the auger to an attached thresher. Various sprockets, pulleys, chains, belts and shafts operate the harvester using power from a take-off source located on the main frame of the thresher.

The cutter bar and its associated sickle drive assembly are arranged to flex so as to follow the contour of the ground both transversely to and along the direction of travel. This is achieved by mounting the cutter bar assembly on the ends of several constant strength leaf springs anchored to the base of the main frame of the harvester. A contoured deck covers the constant strength leaf springs, thus providing a smooth, nearly horizontal convex surface of constant radius across which the cut plants are swept by the reel bats. The reel bats deliver the cut plants to a cross auger conveyor. Any kernels of grain dropping from the plants onto the platform are brushed along by the foliage into the cross auger conveyor.

The low profile structure of the platform permits the cross auger conveyor to be mounted only a short distance above ground level. In fact the cavity formed below the auger is at approximately the same level as that of the cutting bar. This feature minimizes loss of crop kernels shaken loose from husks or pods during the harvesting operation.

Use of oppositely wound spirals on the two ends of the auger serves to carry plant foliage from both ends of the platform toward the middle. Axially aligned protrusions at the midsection range of the auger urge the collected crop bearing foliage into an elevator assembly which feeds into a thresher or crop processor. Any free kernels of grain present in the well under the auger are enmeshed into the foliage and stalks such that they are delivered into the thresher.

To assure that the cutter carrying platform closely follows the contour of the ground, there are a series of pivotally mounted sensing fingers situated beneath and slightly behind the cutting bar assembly. These fingers contact the ground. When the platform is so low as to tend to gouge into the dirt, the sensing fingers relay the status to an elevation height control system which raises the platform. Conversely, when the platform is too high off the ground such that grain might be skipped, the sensing fingers signal the height control system to lower the platform.

The automatic height control system can be disabled and manual height control utilized. Use of manual control would be desirable, for example, when harvesting grains having heads at the top of the stalks whereby the plants could be severed several inches above ground level. For continuous off-the-ground operation of the platform and cutter bar, there are a series of permanently attached stabilizers which can be locked in place. Locking of the stabilizers and crop dividers, more rigidly positions the cutting bar with respect to the main frame of the harvester. When not locked, the stabilizers serve to limit motion of the constant strength springs which primarily functions in supporting the cutter bar assembly. Motion is limited to values less than the permanent yield point of the springs.

BRIEF DESCRIPTION OF THE DRAWINGS

Having generally described the nature of the invention and the manner in which it functions, reference is made to the accompanying drawings, in which.

DESCRIPTION OF THE PREFERRED EMBODIMENT

Figure 1:
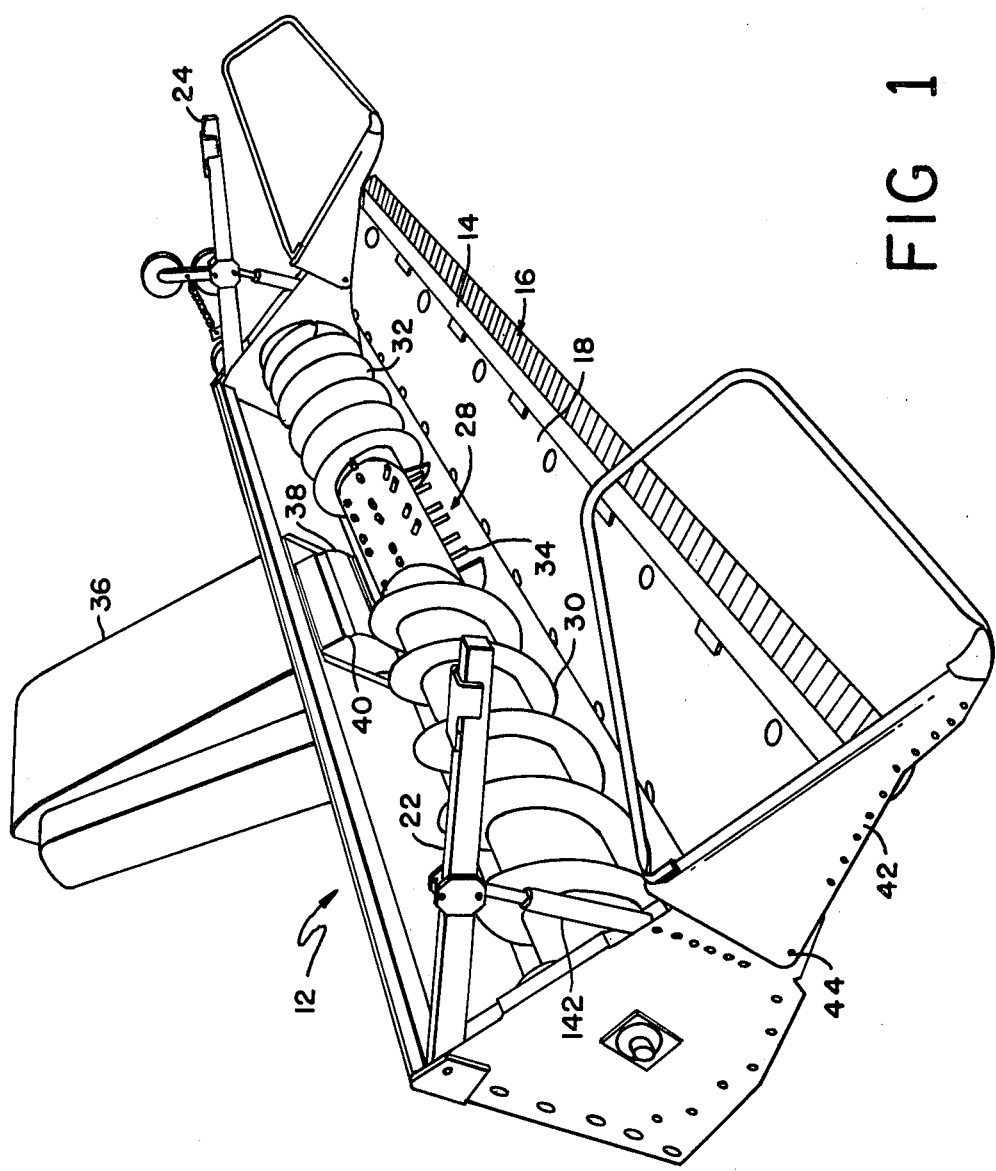
FIG. 1 shows an isometric view of a harvester constructed in accordance with the invention but having the pickup reel removed.

In FIG. 1 there is shown an isometric view of a crop harvesting machine 12 which is arranged to be attached to and powered from a combine or other mobile thresher, not shown. The reel assembly has been removed from the harvester so as to better expose the manner in which the various parts cooperate one with the next. A cutter bar 14 having oscillating sickle knives 16 is positioned along the front edge of the harvester. In operation harvesting machine 12 moves forward so that cutter bar 14 travels above or in light contact with the ground, severing the stalks of small grain and bean crops at a point near ground level. The severed crop falls onto the smoothly contoured surface of platform 18. Reel assembly 20 (See FIG. 2), mounted on support arms 22 and 24 rotates such that the reel bats (see bats 26 in FIG. 2) travel from front to back across platform 18 sweeping the cuttings into rotating cross auger 28. As viewed in FIG. 1, auger 28 rotates clockwise. Counterwound spirals 30 and 32 at the ends of the auger are arranged to move the crop cuttings toward the center section of the auger. Fingers 34 protrude from the central drum region of the auger to urge crop material up the back side of the cavity in which auger 28 nests. Crops thus lifted pass into the throat of feeder conveyor 36. Feeder conveyor 36 has therein rotating chains 38, having cross slats 40 which lift the harvested crop material up the conveyor shaft and into the main cylinder of the crop processor (not shown).

Fingers 34 move cyclically in and out of the central drum region of the auger, being actuated by an internal cam mechanism. The fingers of each successive row are fully extended as they approach platform 18 and are then gradually withdrawn into the drum until they are fully retracted by the time they are opposite the end of rotating chains 38. The action of cyclically withdrawing and extending the set of fingers 34 serves to make them self cleaning in that stalks and weeds will not become entangled thereon to the point where they need removal by an operator.

Crop divider 42 separates the cut from the uncut crop. Crop divider 42 pivots on pin 44 such that the forward end of the divider moves freely up and down with terrain variations.

Figure 2:
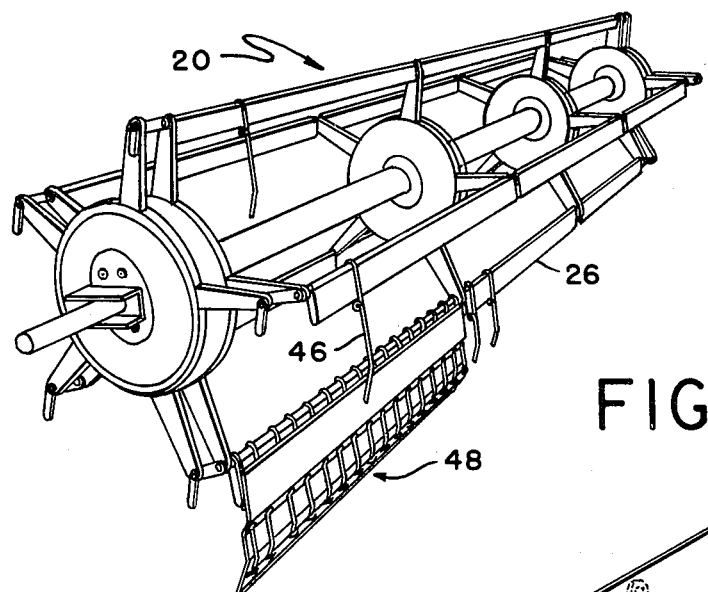
FIG. 2 shows an isometric view of a pickup reel which mounts on the support arms of FIG. 1 and having on one of its bat support sections a quick attach-detach flexible flap; in accordance with the invention and claims of copending United States patent application, Ser. No. 614,396 of Millard M. Williams and John Arnold entitled "Crop Harvesting Machine with Improved Pickup Reel Assembly" filed in the United States Patent and Trademark Office contemporaneously herewith and assigned to the same assignee as the present application and invention, to-wit: Avco Corporation.
Figure 3:
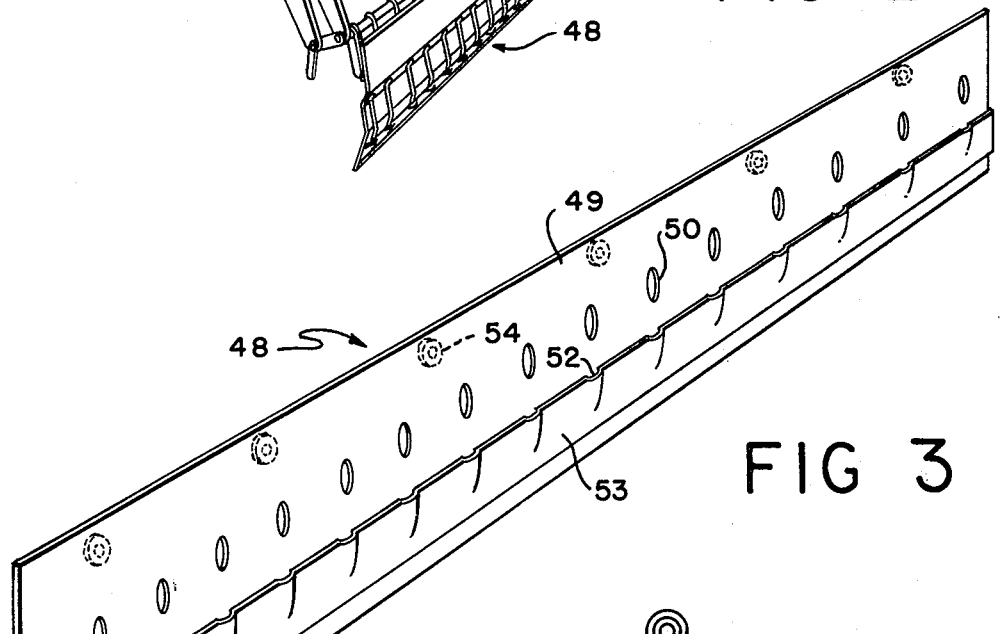
FIG. 3 is an enlarged view of the flexible flap showing details of its construction.

FIG. 3 shows a quick attach-detach flexible flap 48, provided in accordance with the aforesaid Williams - Arnold invention. The flaps mount on bat sections 26 of reel assembly 20 shown in FIG. 2. One of the flexible flaps is shown installed on a bat section in FIG. 2 and it will be understood that like flexible flaps can be mounted on all bat sections of reel assembly 20.

Figure 4:
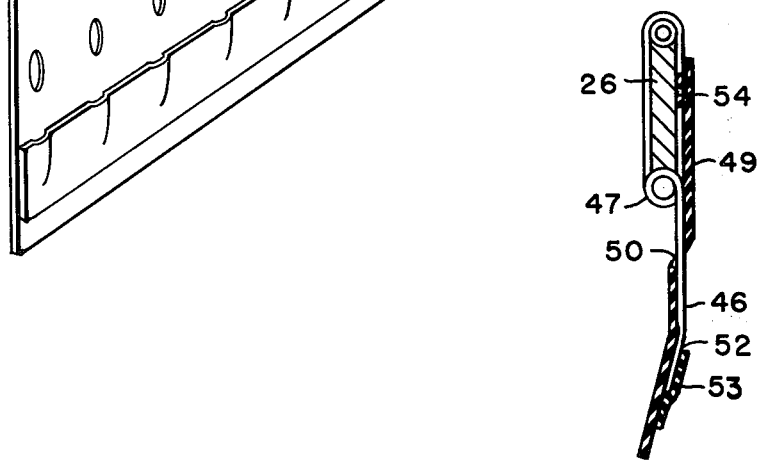
FIG. 4 is a cross-sectional view of the flap of FIG. 3 when mounted as shown in FIG. 2.

As shown in FIGS. 2, 3, and 4, flexible flap 48 comprises a base sheet 49 made of a rubberized fabric or the like. Holes 50 in the base sheet are spaced for insertion therein of the plurality of reel fingers 46 mounted on each reel bat section 26. Snaps 54 allow attachment of flexible flap 48 to the reel bat 26. The flexible flap attaches as shown in FIG. 4. The lower section of the flap is on the back side of fingers 46 and the upper flap section is on the front side of fingers 46. Holes 50 in base sheet 49 are positioned so as to be below spring loop 47 in reel finger 46. The lower section of flap 49 has a strip 53 attached thereon as by cementing or vulcanizing (See FIG. 3) having pockets 52 into which the end of reel fingers 46 nest (See FIG. 4).

Strip 53 serves also as a stiffener for the lower edge of flap 48. This prevents flap buckling as the reel bats are forced into dense or matted growths. With the flexible flaps attached as shown in FIGS. 2 and 4, the plants are yieldably urged by the reel assembly across the platform and into the auger.

Figure 5:
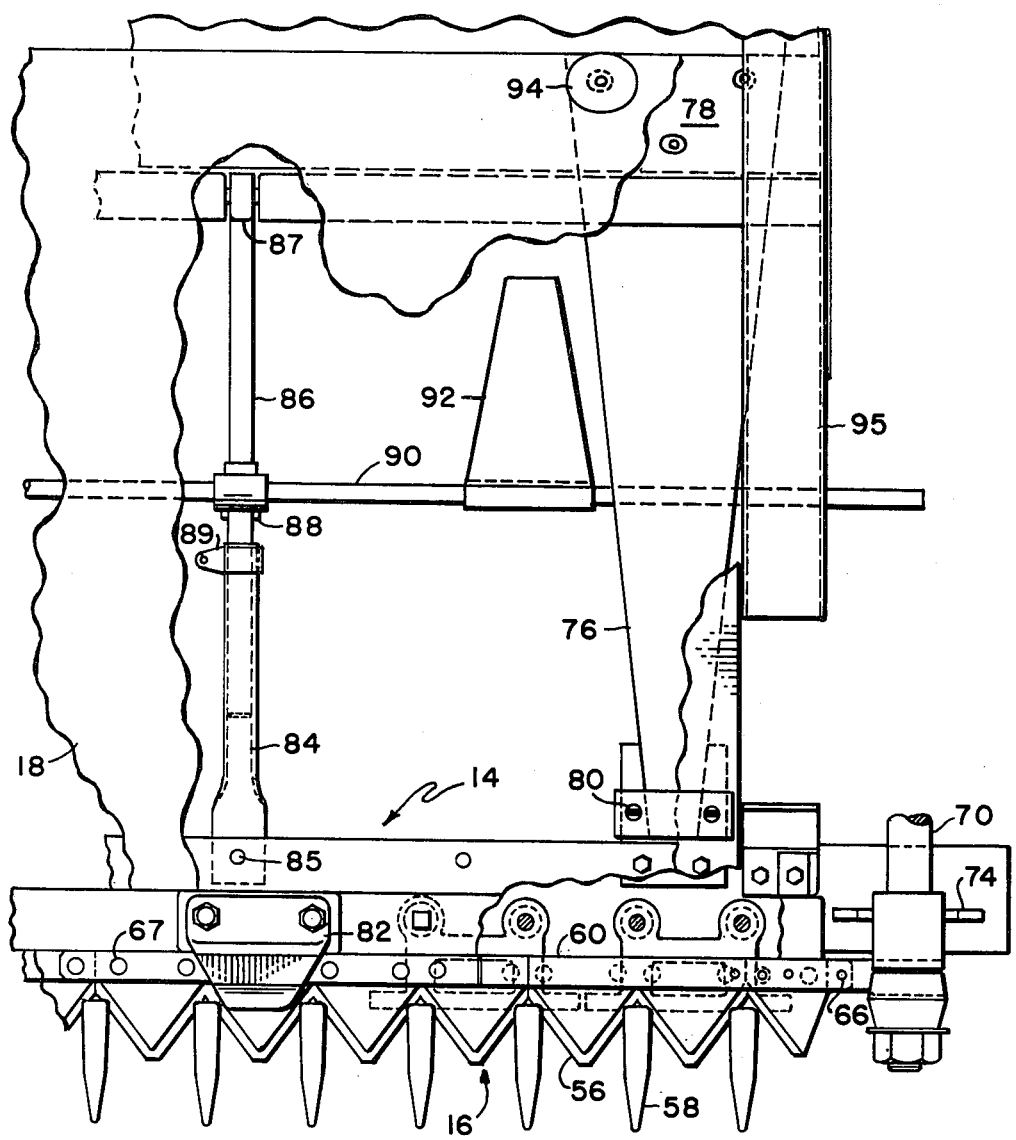
FIG. 5 is a cutaway view of the drive end of the cutter bar assembly showing the support structure between the cutter bar and the main frame of the harvester.
Figure 6:
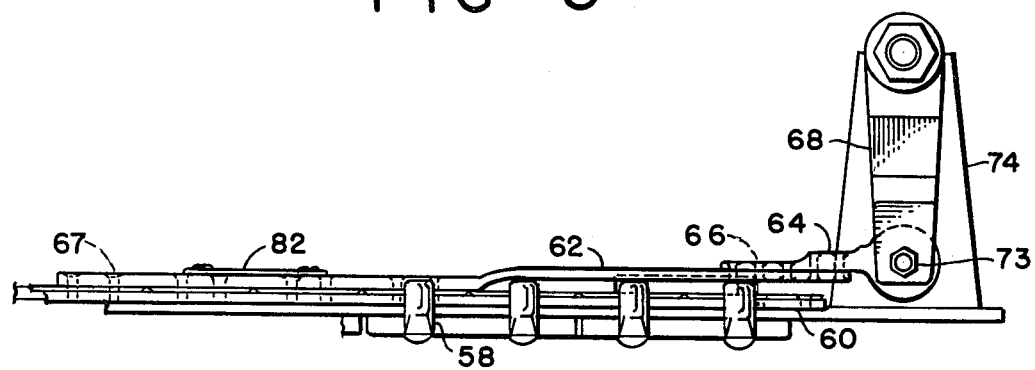
FIG. 6 is a front view of the cutter bar of FIG. 5 showing the sickle drive assembly.

FIG. 5 shows a partially cutaway view taken at the drive end of the cutter bar. Cutter bar assembly 14 has on its leading edge a multiplicity of knife guards 58. Oscillating sickle 16 comprising a multiplicity of triangular knives 56 attached as by rivets to knife bar 60 moves back and forth so as to sever crop stalks coming between the knife edges and guards 58. As may be seen in FIG. 6, the oscillatory motion is achieved by the turning of crank arm 68 through an arc of approximately a half radian in the bearing formed at the top end of support 74. Turning of crank 68 through a small arc will result in sickle bar drive point 73 (See FIG. 6) moving not only left and right but up and down an amount equal to the length of crank arm 68 times the quantity (1 - cosine of the half arc in degrees). This up and down motion precludes direct attachment of crank arm 68 to the end of knife bar 60.

To keep motion of knife bar 60 in a horizontal plane, pivot point 73 was attached by means of rivets 66 to a flexible piece of bar stock 62 via pivotal mount 64. Bar stock 62 is attached to knife bar 60 by means of countersunk rivets 67. Attachment is in an area that is sufficiently far removed from the end of the knife bar so that flexing of bar stock 62 does not result in metal fatigue. In the unit reduced to practice the distance from pivot point 73 to the nearest of rivets 67 was about a foot. A series of knife hold down clips 82 keeps the sickle bar operating so that knives 56 maintain shear contact with guards 58.

Figure 7:
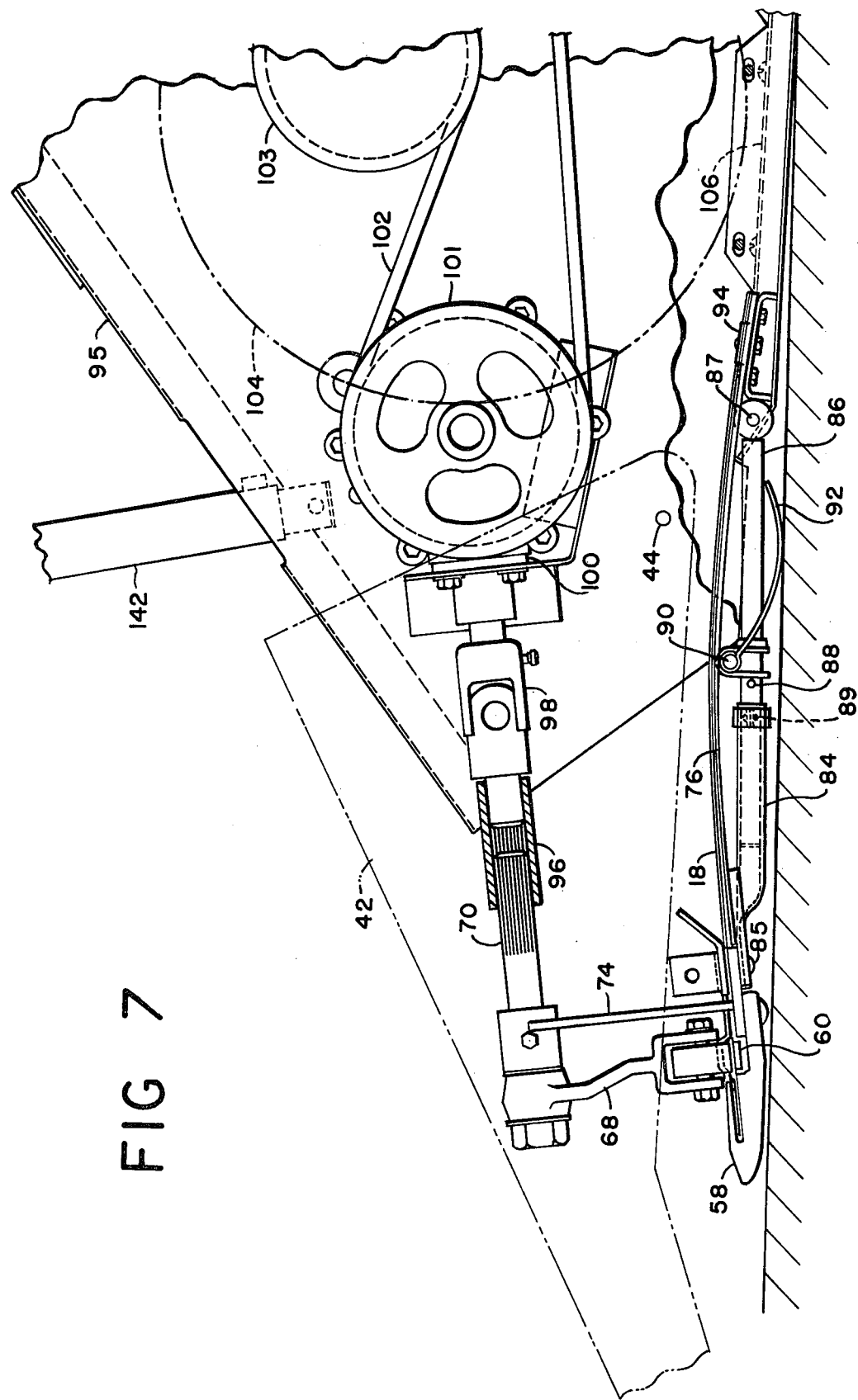
FIG. 7 is an end view of the cutter bar assembly as seen from the drive end showing the cooperation between the drive mechanism, the cutter bar, the constant strength leaf springs, the contoured deck, the stabilizer supports and the ground sensing fingers.

The cutter bar assembly 14 mounts in cantilevered fashion to main frame 78 of harvester 12 by means of a number of equally spaced constant taper leaf springs 76 (See FIG. 5). Leaf springs 76 are firmly attached at their base ends to frame 78 as for example by bolts, and at their narrow ends attach to the cutter bar by means of a combination bolt and riveted assembly 80. FIG. 7 shows a side view of leaf springs 76 with harvester side panel 95 partially removed.

The FIG. 7 view shows how the skin of deck platform 18 lays immediately above and is supported by springs 76. This allows for a smooth contour that forms the arc of a circle which plants traverse all the way from where they are severed at sickle bar 16 to cavity 106 which is beneath rotating auger 28. The periphery of auger spiral 32 is shown as phantom line 104 in FIG. 7.

The forward end of cutter bar 14 flexes up and down as the contour of the ground changes. This flexing is made possible by the use of springs 76. In order for flexing to be possible during the harvesting operation, the drive train has to move up and down at the cutter bar end. This is accomplished as shown in FIG. 7. Shaft 70 twists in alternate directions in the bearing at the end of support member 74. The driven end of shaft 70 has splines cut thereon for positive transfer of power from mating spline teeth on the interior of cylindrical member 96. Cylindrical member 96 is firmly attached to universal joint 98 which is fastened to the shaft extending from drive mechanism 100. In the unit reduced to practice drive mechanism 100 was of the swash plate type being driven from pulley 101 by means of rubber V-Belt 102. Drive mechanism 100 is secured to the frame of the harvester and as the cutter bar 14 flexes up and down, the drive train accommodates the off axis and length variable changes by means of universal joint 98 and the spline section coupling cylinder 96 to shaft 70.

To prevent buckling of the skin of platform 18 during the flexing, a series of large washers 94 are used with the bolts which hold the skin in place at the back edge of the platform. Washers 94 allow the holes in the skin to be of sufficient size to move slightly to and fro with respect to the axis of the tie down bolts.

In order to protect springs 76 from buckling when guards 58 bump into obstacles, there are a series of stabilizer bars interspersed along the length of the platform between leaf springs 76. Each stabilizer bar (See FIGS. 5 and 7) consists of: tubular member 84 which attaches to cutter bar 14 by bolt 85; cylindrical shaft 86 slideable within tube 84 and pivotally mounted to frame 78 at point 87; and, motion limit pin 88 which serves as a stop for the compressive deformation of the cutter bar toward the harvester frame.

The series of cylindrical shafts 86 serve as a support member for a multiplicity of sensing fingers 92. Sensing fingers 92 are attached to shaft 90 which is rotatably mounted by clamp-held-sleeves to cylindrical shafts 86. Spring urging means, not shown, tends to hold sensing fingers 92 in contact with the ground as shown in FIG. 7. The angular relationship between the sensing fingers and the platform deck of the harvester is used to automatically control the vertical positioning of the cutter carrying platform 18 with respect to ground. Means for accomplishing automatic height control will be more fully explained later.

Figure 8:
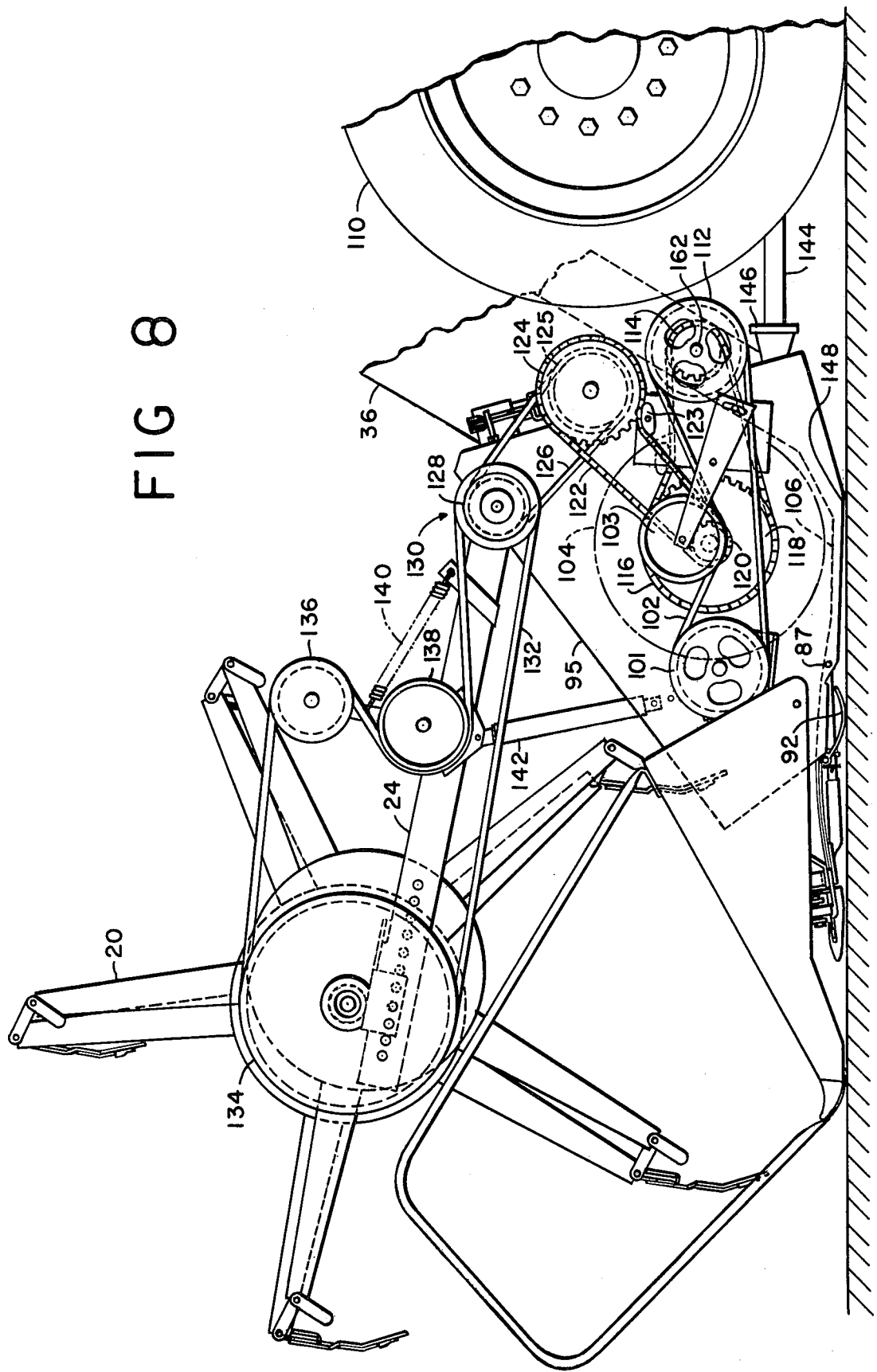
FIG. 8 shows a left hand end view of the harvester with protective covers removed so as to expose the power drive train.

Referring now to FIG. 8 there is shown an end view of the harvester with the protective covering of end plate 95 removed to show the drive train mechanism. Pulley 101 drives the sickle bar in the method explained above. Power to drive pulley 101 comes from drive pulley 112 via V-Belt 102. Tension on belt 102 is maintained by idler pulley 103. Coaxially arranged on drive shaft 162 with pulley 112 is chain drive sprocket 114. Drive shaft 162 receives its power from the drive mechanism of combine, mobile thresher or the like, which is represented only by driving wheel 110.

Figures 9, 10:
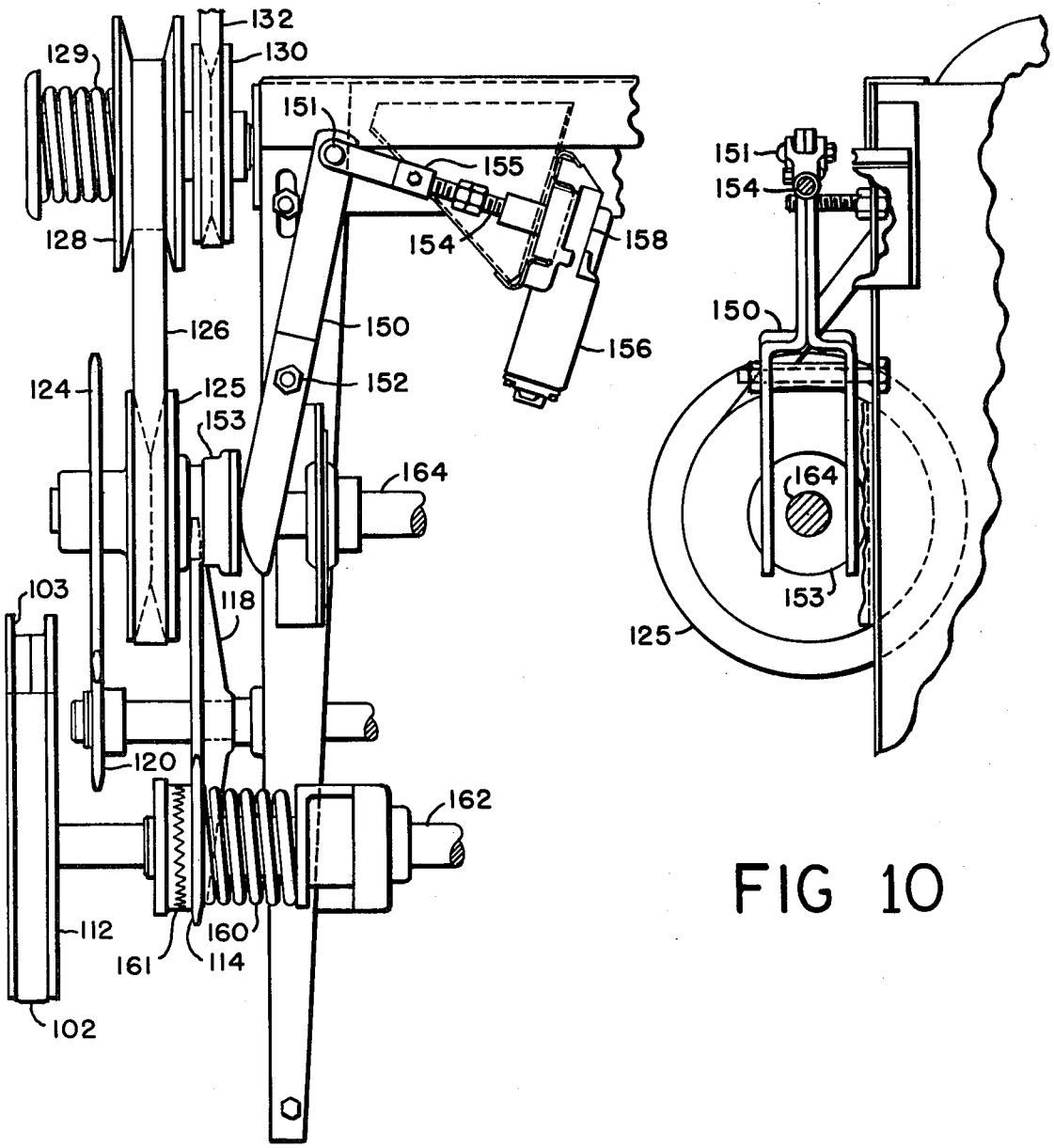
FIG. 9 shows the details of the reel speed adjustment mechanism.
FIG. 10 is an end view of the servomotor shown in the top view of FIG. 9.

Chain drive sprocket 114 operates through driving chain 116 and sprocket 118 to furnish power to auger 28 which is depicted in outline form by phantom line 104. Coaxially mounted on the auger shaft with sprocket 118 is sprocket 120. Sprocket 120 drives sprocket 124 via chain 122. Tension on chain 122 is maintained by adjustable idler shoe 123. Sprocket 124 operates through a coaxially arranged pulley 125 to drive mating pulley 128 via V-belt 126. Pulleys 125 and 128 operate in combination to control the rotational rate of reel 20. This is better seen by reference to FIGS. 9 and 10. In FIG. 9 pulleys 125 and 128 are shown to be of the type wherein the sheave halves are separable. Belt 126 is depicted as riding low in pulley 128 and high in pulley 125. Under these conditions pulley 128 would rotate at maximum speed.

Speed control is accomplished as follows. Lever arm 150 pivots on pin 152. The forked lower end of arm 150 (See FIG. 10) rides against thrust bearing 153 which is coaxially mounted with respect to pulley 125. Pressure can be exerted on thrust bearing 153 by means of shaft 154 which is clevis mounted to arm 150 by pin 151. Positional control of shaft 154 is achieved by electric drive means. Direct current motor 156 turns shaft 154 through gear box 158. Clevis 155 has internally cut threads which mate with threads cut on the end of shaft 154. When motor 156 turns in one direction force is exerted on lever arm 150 to bring the sheaves of pulley 125 closer together. Conversely, rotation of the armature of motor 156 in the opposite direction allows the sheaves of pulley 125 to separate. Spring 129 mounted coaxially with pulley 128 applies force tending to bring the sheaves of pulley 128 together. This action keeps a constant tension on V-belt 126 since the action of spring 129 is such as to keep a continual side pressure on V-belt 126.

The machine operator has controls which allow him to operate motor 156 in either direction. Thus while underway, the operator can speed up or slow down the rotational rate of pulley 130 which is coaxially mounted and locked to the same shaft as pulley 128. Belt 132 rides on pulley 130.

Turning now to FIG. 8, it can be seen that belt 132 furnishes the drive power for operating reel 20 via the large diameter pulley 134 mounted coaxially to the reel. Idler pulleys 136 and 138 maintain proper tension on belt 132 via the take-up mechanism associated with spring 140.

Reel 20 may be raised and lowered to accommodate the height of the crop being harvested. This is done by actuation of piston 142 which operates to raise and lower arm 24. There are two of the pistons 142, one at each end of the harvester (See FIG. 1) and the two pistons operate in unison.

During machine operation, the operator will adjust the forward speed of the vehicle to accommodate crop and terrain conditions. With forward speed optimized, he then advances or reverses motor 156 (See FIG. 9) so as to match the speed of reel 20 (See FIG. 8) to the forward speed of the harvester. The operator will adjust reel speed so as to have the reel flaps 48, or the reel fingers 46 for cases where reel flaps are not used, cross the surface of the cutting bar at a rate that is slightly in excess of the forward speed of the harvester through the field. This will assure that crop cuttings are cleared from the cutting bar area as fast as the plants are severed from their roots.

FIG. 9 shows one additional feature of the harvester. Main drive power comes in via shaft 162. Spring 160 and toothed clutch 161 combine to form a safety release mechanism should the auger and reel loads become excessive.

Elevation control of the cutting bar is explained by reference to FIG. 11. The main frame 78 of the harvester has feeder conveyor 36 extending upwardly from its midsection. Feeder conveyor 36 mounts pivotally onto the front end of combine 170 by means of locking mechanism 168. Locomotion for combine 170 is provided by drive wheel 110 and its near side companion, not shown. From mounting axle 172 of drive wheel 110 there is suspended hydraulic cylinder 174. The piston actuated extendable shaft 144 of cylinder 174 is insertably positionable in bell housing 146. It is to be noted that the FIG. 11 embodiment is depicted for functional simplicity and that in reality there are two hydraulic cylinders 174 and two bell housings 146, one on either side of feeder conveyor 36. Application of fluid pressure through supply line 178 serves to raise knife guards 58 off the ground. A decrease in pressure at supply line 178 results in lowering knife guards 58 toward the ground.

Figure 11:
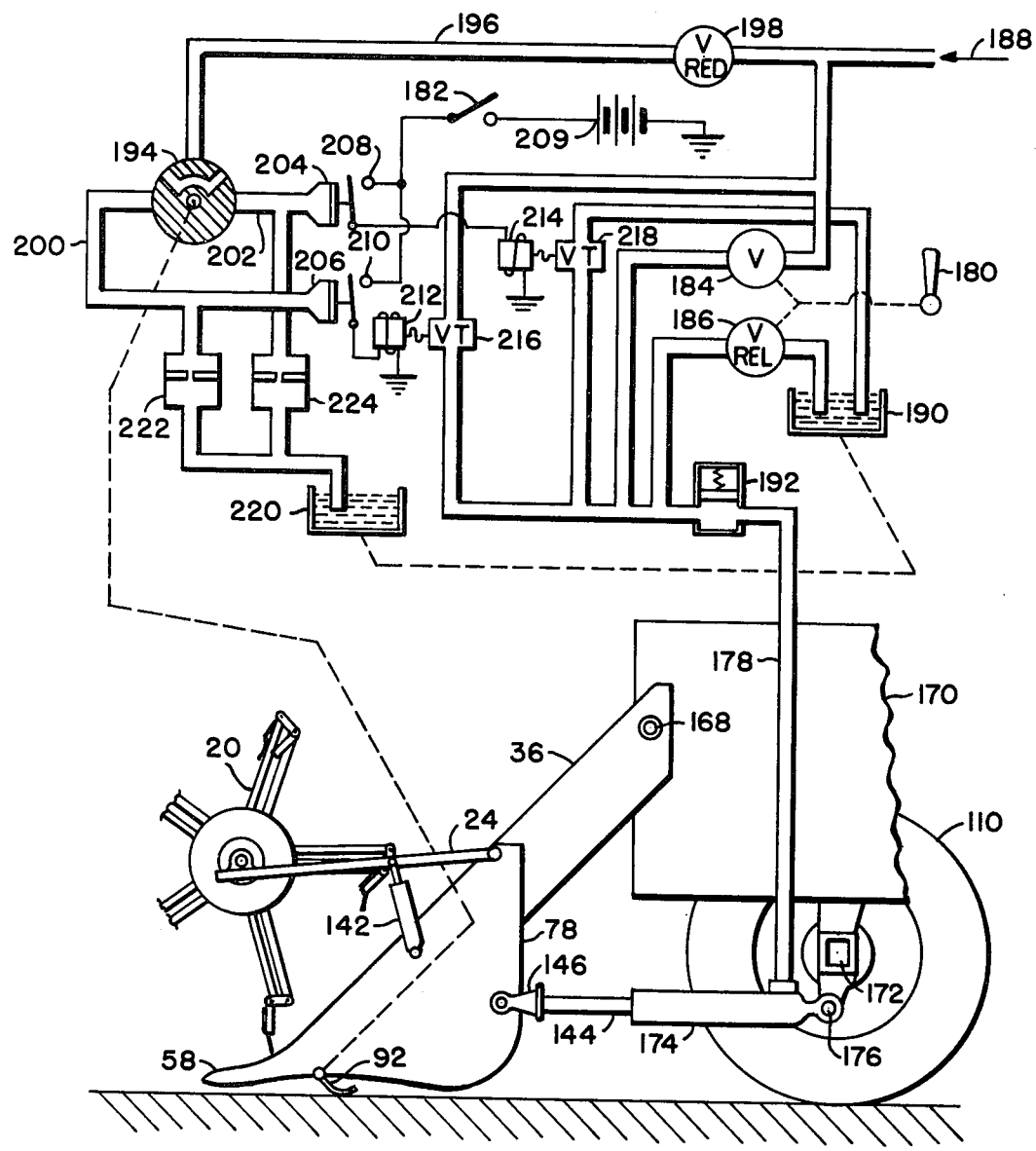
FIG. 11 shows a harvester unit in partial end view as associated with the frame structure of a typical combine and showing in schematic form the hydraulic and electrical servo system employed for cutter bar elevational control.

The schematic of FIG. 11 shows the hydraulic and electrical servo system which is employed for elevational control of the cutter bar. With the system shown, both manual and automatic height control modes are provided. Manual control is achieved through operator manipulation of control lever 180. Automatic control is enabled by closure of switch 182.

In the manual control mode the operator raises the cutting height by manipulation of lever 180 so as to open valve 184. Opening valve 184 allows high pressure oil to flow in from source 188 which may, for example, be the hydraulic pump on the combine. This increases the amount of oil in line 178 and extends the piston in cylinder 174 so as to force platform 78 further from axle 172.

Turning lever 180 in the opposite direction opens pressure release valve 186 resulting in a withdrawal of the piston in hydraulic cylinder 174. This causes the guards 58 to drop closer to ground level. Oil thus released passes through valve 186 and into oil sump 190.

Pressure accumulator 192 functions to smooth out the response due to traversing uneven terrain as well as the normal bumps and jolts experienced by operational farm machinery.

In the automatic mode, electrical switch 182 is closed and the hydraulic system responds to signals emanating from sensing fingers 92. Sensing fingers 92 are biased by spring urging means so as to attempt to turn fingers 92 in a clockwise direction (as shown in the view depicted in FIG. 11) in an effort to sense the presence of ground level. Rotation of sensing fingers 92 is linked to two-way valve 194. Two-way valve 194 receives a supply of hydraulic fluid from supply line 196. The fluid in line 196 is at a reduced pressure from that of the main supply 188 due to the presence of reducing valve 198. Use of reduced pressure in the automatic control section cuts down on leakage and makes actuation of valve 194 easy. As depicted in FIG. 11, two-way valve 194 has a built-in dead zone. This keeps the sensing mechanism from continually hunting in that there is an appreciable mid-range set of values for platform height above ground wherein sensing fingers 92 are satisfied with the status quo.

However, when the cutter carrying platform gets too close to ground level, sensing fingers 92 will be turned back to approximately the 3-o'clock position and valve 194 will turn so that fluid from line 196 passes through to line 200. Pressurization of line 200 closes contacts 210 in bellows switch 206. Closure of contacts 210 energizes by means of battery 209 the coil of solenoid valve 212 which opens throttle valve 216 further displacing the piston 144 of hydraulic cylinder 174. This results in the raising of the harvester platform until the sensing fingers 92 rotate so as to close the connection in valve 194 between lines 196 and 200.

With the supply cut off from line 200, orifice 222 bleeds off residual pressure, thus assuring that valve 206 relaxes so as to open switch contacts 210.

Conversely, when the cutter carrying platform is too high above ground level, sensing fingers 92 rotate clockwise to something like a 5-o'clock position where two-way valve 194 allows fluid to pass from supply line 196 to line 202. Pressure in line 202 actuates bellows switch 204, closing switch contacts 208. Powered by battery 209, this energizes solenoid valve 214 and opens throttle valve 218. Actuation of throttle valve 218 dumps fluid in line 178 until such point as the cutter carrying platform gets close enough to ground level to cause sensing fingers 92 to close valve 194. With no more fluid being delivered to line 202, residual pressure in the line is bled off into sump 220 via orifice valve 224.

As described above then, in the automatic mode, the sensing fingers exercise the hydraulic fluid at cylinder 174 to keep the level of the cutter carrying platform within a prescribed range of acceptable operational values.

When going from one job to the next or when harvesting a crop such as wheat or rye, the operator can disable the automatic height control system by opening switch 182. The operator can then manually adjust the height of the cutting bar by means of control lever 180.

When cutting grain whose stalks can be severed several inches above ground level, such as wheat, the operator may want to disable the flexible cutting bar feature. This is possible. The grain platform is raised to a reasonable height above ground position. Then (See FIG. 5) the stabilizer bars are clamped and both crop dividers pinned to the cutter carrying platform. The stabilizer bars are clamped by tightening the screws which connect one flange of clamp 89 to its mating section. Compressing clamp 89 rigidly, locks tubular member 84 to cylindrical shaft 86. With all stabilizer bars thus locked in place, the harvester performs in much the same way as the more conventional combine header unit. Loosening of clamps 89 converts the harvester to full flexing cutter status. The crop dividers must also be unpinned to reachieve their full flexing status.

Figure 12:
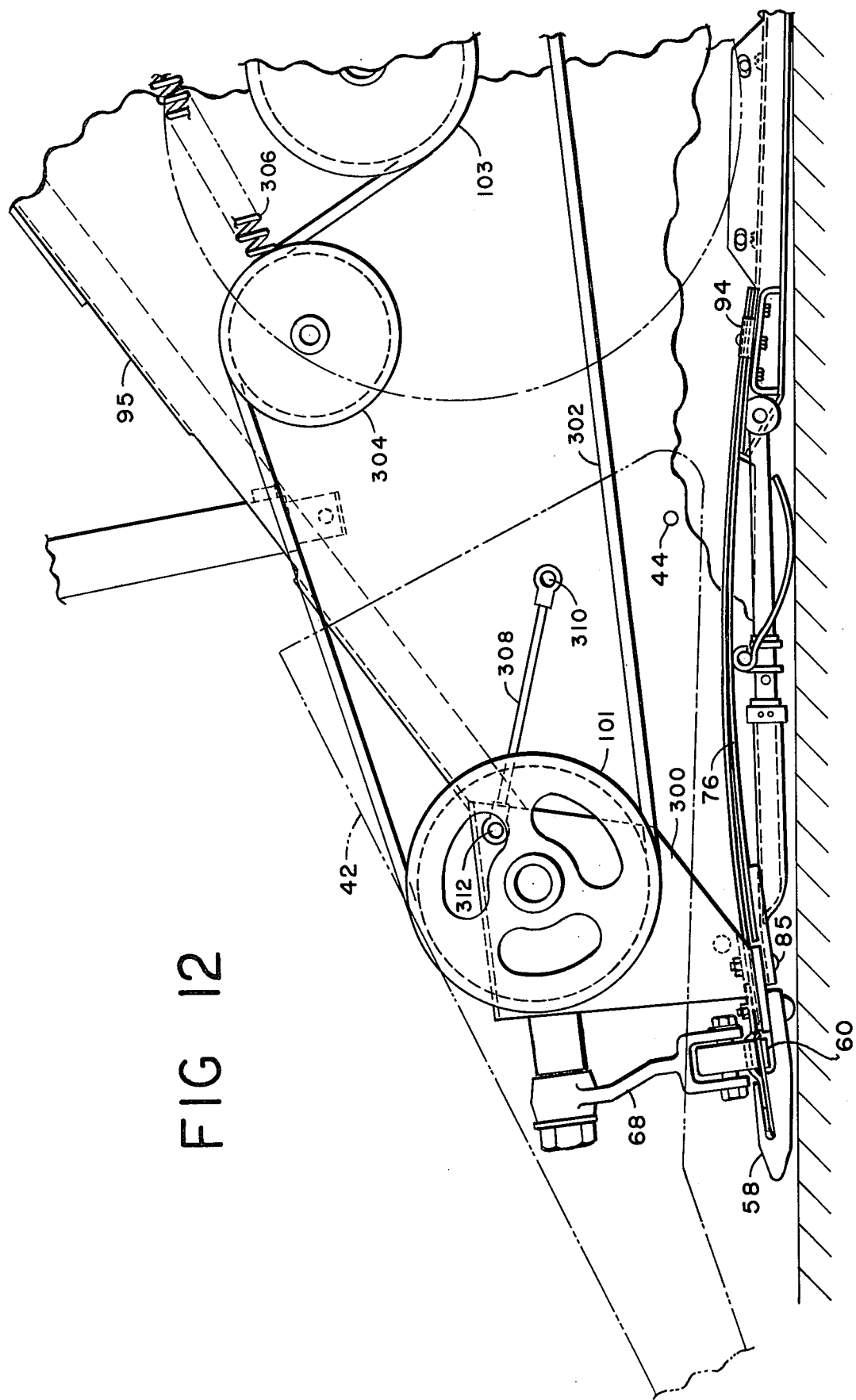
FIG. 12 shows an end view of the cutter bar assembly wherein an alternate drive mechanism is presented showing the sickle bar drive mounted adjacent the end of the sickle.

FIG. 12 shows an alternate implementation of the sickle bar drive mechanism. In the FIG. 7 implementation, the transmission, which converts the rotary motion of pulley 101 to the back and forth motion of arm 68, is attached to the main frame of the harvester. In the FIG. 12 embodiment, the transmission is mounted within the generally U-shaped support member 300. Support member 300 is fixedly attached to the end of cutter bar assembly 14 as by means of bolts 85. Drive belt 302 of the FIG. 12 implementation is longer than belt 102 of FIG. 7.

With the FIG. 12 implementation, pulley 101 moves up and down as the cutter bar flexes in consonance with the contour of the ground. To accommodate this flexing, idler pulley 304 has been added. Idler pulley 304 is mounted for rotation on the end of an arm (not shown) to which is also attached one end of spring 306. The other end of spring 306 is anchored to the frame of the harvester in order to exert a clockwise force on idler pulley 304, biasing the idler pulley against belt 302.

Stabilizer rod 308 at one end is pivotally mounted via bolt 310 to the main frame of the harvester. At its other end rod 308 is pivotally mounted via bolt 312 to support member 300. Rod 308 serves to counter the forces of belt 302 on pulley 101.

In the FIG. 12 implementation the added weight of the transmission must be supported by the cantilevered springs 76. In the unit reduced to practice this was achieved by making spring 76, shown on the right in FIG. 5, stronger than its companions across the remainder of the platform. The tapered spring 76 adjacent the end of the cutter bar was made about twice as strong for the FIG. 12 implementation as it was for the FIG. 7 embodiment.

It will be understood that the invention is not limited by the specific embodiment disclosed in the drawings. Various modifications can be made with regard to the particular structures without limiting the scope of this invention. For example, another height control system that can be implemented is one in which pressure sensing shoes attached to member 14 (See FIG. 5) are used to regulate height. The pressure sensing shoes could, through servo control means, maintain harvester contact with the ground within predetermined pressure limits. Additionally, use of an all-electric servo control system is completely feasible and is to be preferred in some embodiments.

We claim:

1. A grain and bean harvesting machine intended for transverse mounting in front of a mobile thresher, comprising:
   a main supporting frame;
   a transversely extending platform for collecting severed crop cuttings, the rear half of said platform being rigidly supported from the lower part of said frame, said rear half having a gently sloping front-to-rear contour without abrupt discontinuities;
   a cutter bar assembly mounted at the front edge of said transversely extending platform;
   a rotating cross auger supported on said frame at the rear of said platform;
   a feeder conveyor supported on said frame aft of said auger, said conveyor providing for the transfer of crop cuttings from said auger to said mobile thresher;
   a reel assembly rotatably mounted on a horizontal axis above said transversely extending platform adjacent the front thereof, said assembly including adjustable support arms for attaching said reel assembly to said frame; and
   flexible means mounting said cutter bar assembly in cantilevered fashion at the leading edge of said transversely extending platform, said flexible means including a multiplicity of spaced apart leaf springs having their front ends affixed to said cutter bar assembly and extending rearwardly to attachment points on said main supporting frame, said leaf springs having a constant taper being widest at the attachment point to said main frame, said constant taper assuring that said leaf springs flex up and down along an arc of substantially constant radius from said cutter bar assembly to their attachment points on said main frame,
   a set of stabilizer bars interspersed with said leaf springs, one end of each stabilizer bar being attached to the cutter bar, the other end of each stabilizer bar being pivotally attached to the main frame, each stabilizer member being lengthwise compressible and serving to stabilize the up and down flexing of its respective region of said cutter bar,
   a flexible skin covering said leaf springs and comprising the front half of said transversely extending platform, said flexible skin extending from said cutter bar to the main frame support adjacent the auger.

2. Apparatus according to claim 1 wherein said cutter bar assembly includes a sickle comprising a multiplicity of triangular knives attached to a knife bar, said sickle being driven in an oscillating manner by sickle driving means including a belt driven pulley acting as the input to a swash plate transmission, the output of said transmission being connected by shaft means to a crank arm, said crank arm being connected at its driven end by pivotal jointed means to the end portion of said knife bar.

3. The invention according to claim 1 wherein said cutter bar assembly includes a sickle comprising a multiplicity of triangular knives attached to a knife bar, said sickle being driven in an oscillating manner during the harvesting operation by flexing drive train means, said means including a drive mechanism secured to said main supporting frame.

4. The invention according to claim 1 wherein the stabilizer bars of said cutter bar assembly include motion limit pins serving as a stop for the compressive deformation of said spaced apart leaf springs.

5. The invention according to claim 1 wherein the stabilizer bars of said cutter bar assembly include clamping means for locking said stabilizer bars in place whereby the contour following capability of said cutter bar is disabled.

6. The invention as defined in claim 5 wherein said auger has counter-wound spirals at its ends.

7. The invention as in claim 6 wherein said platform includes a cavity under said auger.

8. Apparatus according to claim 1 and reel driving means for rotating said reel assembly at a continuum of speeds, said reel driving means comprising a pair of expansion pulleys, one being a driving pulley, the other a driven pulley, a V-belt riding on the sheaves of said pulleys, spring urging means for maintaining side pressure on the sheaves of said driven pulley, and a motor actuated lever for applying variable side pressure to the sheaves of the driving member of said pulleys.

9. The invention according to claim 1 and including elevational control connections on said main supporting frame, said connections being drivable from said mobile thresher for varying the height of said cutter carrying platform with respect to ground during the harvesting operation.

10. The invention according to claim 9 wherein the elevational control means includes fluid pressure means coupled to said connections for adjusting the height of said cutter carrying platform relative to ground, said fluid pressure means comprising a source of high pressure fluid, pressure supply lines under valve control leading to hydraulic power cylinders mounted on said mobile thresher, said power cylinders having an operative connection with said main frame through which fluid adjustments on said cylinder result in positional adjustments of said cutter bar with respect to ground, and servo control means including a multiplicity of sensing fingers rotatably mounted by means of a common shaft to the under side of said cutter bar assembly, said common shaft being biased to make said fingers seek contact with the ground, the terminal end of said shaft being connected to a two-way valve having alternate state positions for routing pressurized fluid to pressure sensitive switches having operative connections through solenoid-operating valves to adjust the fluid pressure of the hydraulic power cylinders mounted on said mobile thresher.

11. The invention according to claim 10 wherein said two-way valve includes a built-in dead zone between its alternate state positions, said dead zone serving to prevent said servo control means from continuing to hunt over the mid-range values of height of said cutter bar relative to ground.

* * * * *